Figure 7:
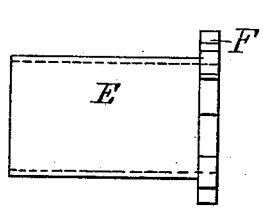

(No Model.) 3 Sheets—Sheet 1.
H. W. SMITH.
FEEDER FOR POLISHING MATERIAL.
No. 334,296. Patented Jan. 12, 1886.
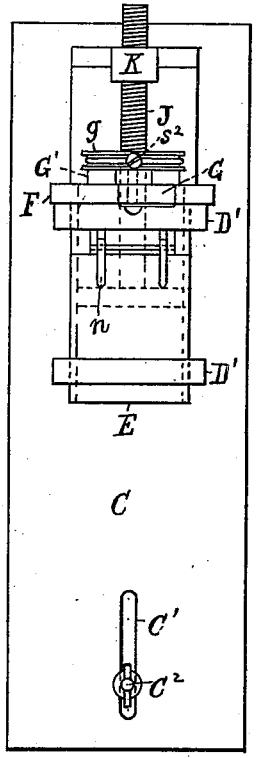
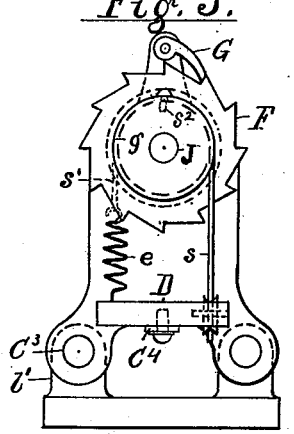
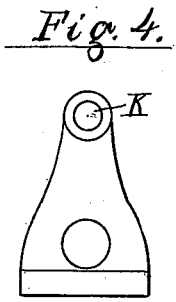
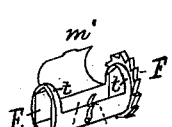
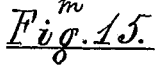
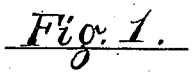
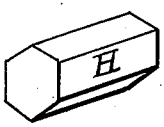
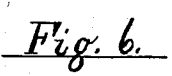
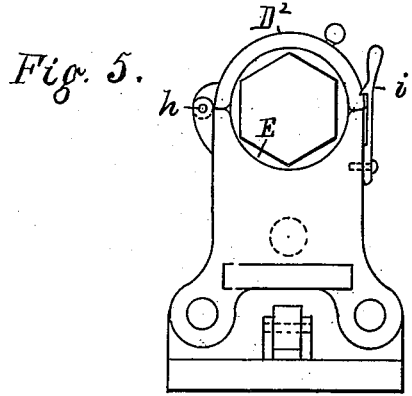
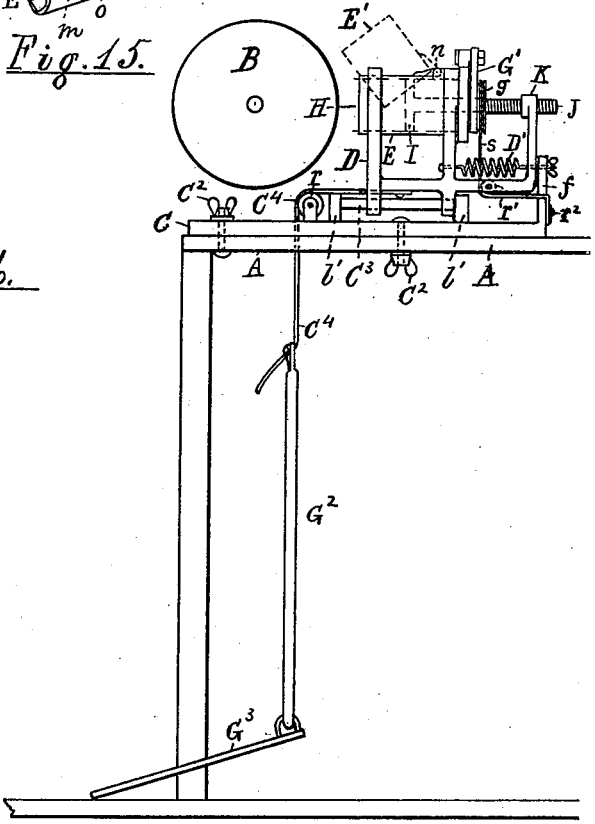
Attest.
L. Lee.
Henry J. Theberath.
Inventor.
Harry W. Smith per
Thos. S. Crane, Atty.
N. PETERS, Photo-Lithographer, Washington, D. C.

(No Model.)  3 Sheets—Sheet 2.

H. W. SMITH.
FEEDER FOR POLISHING MATERIAL.

No. 334,296.  Patented Jan. 12, 1886.

Attest.
Henry J Theberath
L. Lee

Inventor.
Harry W. Smith
per Thos. S. Crane, Atty.

(No Model.) 3 Sheets—Sheet 3.

H. W. SMITH.
FEEDER FOR POLISHING MATERIAL.

No. 334,296. Patented Jan. 12, 1886.

Attest:
L. Lees.
Henry J. Theberath.

Inventor.
H. W. Smith per
Crane & Miller, Attys.

UNITED STATES PATENT OFFICE.

HARRY W. SMITH, OF NEWARK, NEW JERSEY.

FEEDER FOR POLISHING MATERIAL.

SPECIFICATION forming part of Letters Patent No. 334,296, dated January 12, 1886.

Application filed June 17, 1884. Serial No. 135,200. (No model.)

*To all whom it may concern:*

Be it known that I, HARRY W. SMITH, a citizen of the United States, residing in Newark, Essex county, New Jersey, have invented certain new and useful Improvements in Feeders for Polishing Material, fully described and represented in the following specification and the accompanying drawings, forming a part of the same.

This invention consists, primarily, in a holder supplied with a plug of polishing or abrading composition, and in means for sustaining the holder adjacent to the polishing wheel or tool, and for rotating the plug and feeding it forward within the holder.

It also consists in various mechanical devices to facilitate the filling of the holder readily with fresh plugs of composition, and in means for effecting the movements required, all as pointed out in the claims.

This invention is applicable to all classes of machines requiring such a feeding device, and is shown herein in two distinct forms, in one of which the holder is movable to and from a polishing-wheel, and the rotating device and the feeding device are automatically actuated by the reciprocation of the holder. In the other form the holder is adjustable to and from the wheel, but is used in a fixed position, and the feeding device is automatically actuated by the rotation of the holder, and many other modifications may be made without departing from the principle of the invention.

The plugs of composition are formed by combining the material with some cohesive substance, as tallow, so as to be handled more securely, and to prevent the spilling of loose particles; and my invention is intended to feed such plug forward to the rotating surface of a polishing-wheel by mechanism constructed to effect a definite and positive movement of the plug, instead of by pressing the same with irregular force against the wheel.

To secure the most economical use of such polishing composition, the same should be applied to the wheel only in such amount as will adhere to its surface and to the articles pressed upon it, as any surplus is certain to be thrown off and wasted before it has effected any of the abrasive action intended by its use.

By my invention a positive mechanical feed, derived from a positive movement of the operator, is substituted for the irregular pressure, which is unavoidably exerted, in pressing the composition toward a rotating wheel by the unrestrained action of the foot, while the operator is using his hands, as claimed in United States Patent No. 261,860. In such foot mechanism, where the treadle is not provided with any stop, it may serve to press the composition less or more toward the wheel, according to the degree of force applied by the operator's foot and the length of time it is exerted, and the economical or wasteful use of the valuable polishing composition thus depends entirely upon the skill or care of the operator. In my invention, on the contrary, the treadle is raised normally by a spring, and is depressed to the full extent by the operator, thus effecting a precise and uniform movement without the exercise of any care, judgment, or experience. I therefore disclaim the said United States Patent No. 261,860, and claim only my improved construction.

Figure 8:
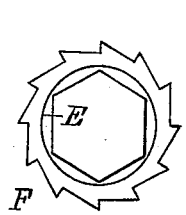
Figure 9:
Figure 10:
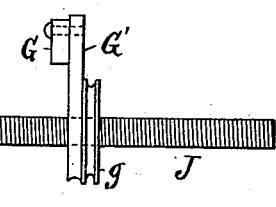
Figure 13:
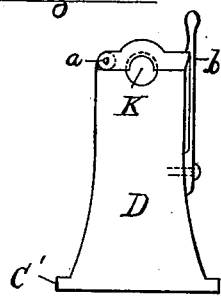
Figure 12:
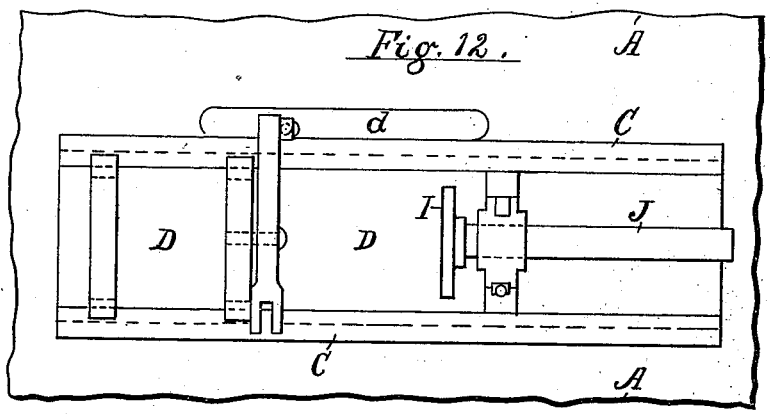
Figure 14:
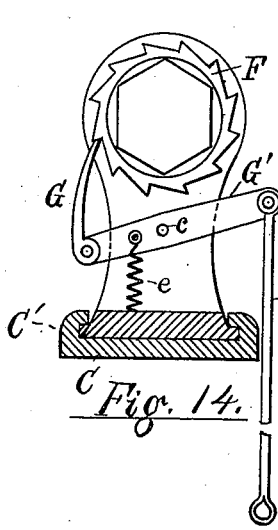
Figure 11:
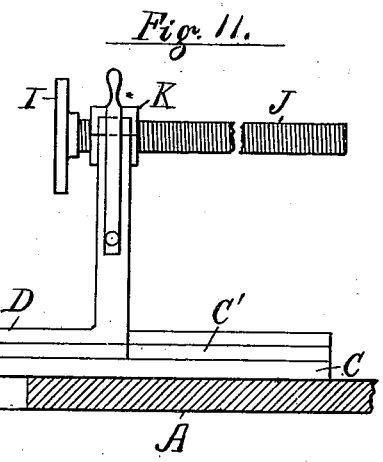
Figure 16:
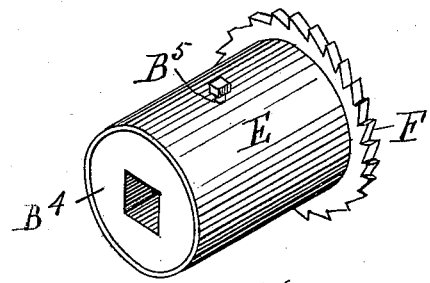

In the drawings, Figure 1 is a side elevation of the reciprocating holder, mounted upon a work-bench adjacent to a polishing-wheel, (the bearings of the wheel not being shown, as they form no part of the invention.) Fig. 2 is a plan of the machine enlarged and detached from the bench A. Fig. 3 is a rear view of the feeding devices. Fig. 4 is a rear view of the nut and its bracket detached from the carrier. Fig. 5 is a front view of the movable carrier. Fig. 6 is a perspective view of the composition plug. Fig. 7 is a side view, and Fig 8 an end view, of the rotary holder. Fig. 9 is a rear view of the pawl disk and follower; and Fig. 10 is a side view of the feed-screw, follower, and pawl disk. Fig. 11 is a side view of a machine having a non-reciprocating holder, the bed of the machine and the work-bench being shown in section. Fig. 12 is a plan of the machine with the holder removed. Fig. 13 is a rear view of the clamp-nut, and Fig. 14 is a rear view of the device for rotating the holder in the same machine; and Fig. 15 is a perspective view of a holder provided with a door in the side for inserting the plug without hinging the entire tube. Fig. 16 is a perspective view of a round holder with a four-sided bush clamped therein; Fig.

Figure 17:
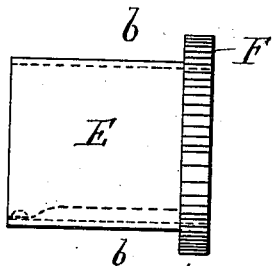
Figure 18:
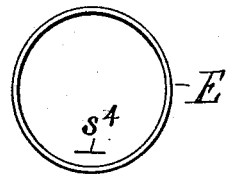

17, a plan of a holder with a clamping-spring inside, and Fig. 18 a section of the same on line $b\ b$ in Fig. 17.

A is a work-bench; B, a polishing-wheel of any kind mounted thereon; C, the bed of the machine; D, a carrier in which the holder E is mounted so as to rotate; F, a ratchet-wheel applied to the holder; G, a pawl to actuate the same, and $G^3$ a treadle for operating the pawl.

The holder is charged with a composition, such as is commonly used for applying rouge, crocus, tripoli, emery, and other polishing materials conveniently to the wheel by hand; and the object of my invention is to apply such materials to the wheel more effectively and economically by inclosing the same in a holder and feeding the same forward against the revolving wheel by a positive feeding mechanism actuated by a positively-moved treadle. In my construction the treadle actuates an intermediate and positive feeding device when pressed downward by the operator's foot and is incapable of pressing the composition too hard against the polishing-wheel, because the feeding mechanism is adjusted to move the plug forward only the desired amount.

The composition used with my apparatus is molded into polygonal or cylindrical plugs, as the six-sided plug H shown in Fig. 6, which will fit into a holder of corresponding bore. The holders shown in Figs. 1 to 15, inclusive, are formed with hexagonal bore to fit such plug, and are provided externally with circular journals adapted to fit bearings $D'$ upon the carrier D, and are partially rotated at intervals to bring a fresh portion of the composition H in contact with the surface of the wheel. If applied exclusively to the rim of the wheel, as shown in the drawings, it is obviously desirable to make the plug H wider than the face of the wheel, especially when the work requires application to the corners or edges of the wheel, as in polishing out hollows or recesses in the articles thus applied. The rotation of the wheel B thus forms a concave face upon the composition plug, the corners of which are subsequently turned into contact with the edges of the wheel by the rotation of the plug, and thus supply them with a full proportion of the polishing material.

The stationary carrier shown at D in Figs. 11 to 14 is formed as a plate rabbeted into the bed C, and capable of being moved lengthwise in the guides or rabbets $C'$, and clamped in any desired position by the clamping-screw $C^2$.

The bed and carrier furnish a means of adjusting the holder to and from a wheel of varying size, as polishing-wheels will wear down from twelve inches to six inches in sometimes a single day. The bed is intended to be secured in any desired relation to the revolving wheel, and the holder adjusted and fastened therein close to the revolving surface. A slight projection of the composition from the holder will then suffice to feed the wheel with a single charge of the material, and when such charge is worn off the only action required is to feed the plug forward a small amount—say one one-hundred-and-twentieth of an inch, when using soft rag-wheels. To effect such movement, a follower, I, is fitted to the bore of the holder, and is fed forward by suitable positively-actuated mechanism, as screw J, fitted to a nut, K. The screw being fastened rigidly to the follower, and the latter being rotated with the holder, it is obvious that the screw will be turned in the nut each time the plug is turned around, and will thus push the follower and plug forward. To draw back the screw rapidly for inserting a fresh plug, the nut is shown in Fig. 13 as made in halves with a cap jointed at $a$, and provided with a spring-catch, $b$, to hold it closed. The thread is removed from the lower half of the nut, so that when the cap is lifted the screw and follower may be slipped back from the holder and entirely removed from the machine. After inserting a new plug of composition in the holder the follower can be restored to its place and the plug pushed into an operative position before the cap of the nut is closed. The pawl G is pivoted at one end of a lever, $G'$, which is pivoted upon the carrier at $c$, and is connected with the treadle by a rod, $G^2$. A slot, $d$, is formed in the table, so that the rod $G^2$ may pass through to the treadle in all the positions assumed by the carrier as the holder is advanced toward the gradually-wearing wheel. As the holder may be secured almost in contact with the wheel, it is obvious that the composition is thoroughly supported and cannot be broken or wasted by its contact with the moving surface; and as the operator may keep his foot upon the treadle all the time, it is evident that no perceptible movement of the body is required to actuate the pawl G, and to thus renew the surface of the wheel at any moment. A spring, $e$, is applied to the pawl-lever to elevate the treadle, and the operator may thus hold the treadle depressed and stand firmly upon it until he desires to feed the plug forward, when a single upward movement of the treadle will permit the pawl to engage the next tooth upon the ratchet, and the depression of the treadle again will suffice to turn around the plug and feed it forward at the same time.

In the construction shown in Figs. 1 to 10 the carrier is mounted movably upon the bed C, being fitted to slide-bars $C^3$, supported in lugs $l'$ upon the bed, and is connected directly to the treadle by means of a strap, $C^4$, carried over a roller, $r$. By this construction the carrier strikes the lugs $l'$ at either end of the bars $C^3$, and is restricted to a limited movement, the operation of the treadle being merely to bring the holder intermittently into proximity to the polishing-wheel. As the wheel wears down, the bed itself is adjusted toward it by means of the guide-slots $C'$ and clampingscrews $C^2$ shown in Figs. 1 and 2 in the same manner as by the rabbets and screws $C^2$ shown in Fig. 11. The guides $C'$ and screws $C^2$ thus afford in either case the means of adjusting the holder to and from the wheel as the latter wears, the nature of my invention requiring no adjustment of the holder to compensate for the consumption of the polishing material, as the invention includes the means of feeding the latter forward while the holder is retained in a fixed relation to the polishing-tool. A spring, $D'$, is attached to the carrier and to a lug, $f$, upon the bed C, so as to hold the carrier normally back from the wheel B, and the pawl-lever is connected with a fixed cord in such manner as to be actuated automatically when the carrier is pulled forward by the depression of the treadle. For this purpose the pawl-lever $G'$ is tapped to fit the screw J, as shown in Figs. 9 and 10, and is provided with a grooved disk, $g$, to which two cords, $s\ s'$, are attached, as shown in Fig. 3. The lever and disk are then screwed upon the follower close to the rear end of the holder, and the rotation of the holder then feeds the screw forward at an equal rate through the lever and through the solid nut K, as seen in Figs. 1 and 4. The rotation is effected by the cord $s$, which is passed under a roller, $r'$, on the carrier, and fastened to the bed at $r^2$, so that the forward movement of the carrier and roller $r'$ draws upon the cord $s$ and pulls the disk, the lever, and the pawl around when the foot is applied to the treadle. The cord $s'$, opposed to the cord $s$, is fastened to a spring, $e$, upon the carrier, and thus serves to retract the pawl, like the spring $e$ in Fig. 14, both cords being fastened to the disk at $s^2$. When the screw is inserted in a solid nut, the follower can only be retracted by turning the screw backward, which is easily accomplished in this case by elevating the pawl and turning the holder rapidly around in its bearings by hand.

To facilitate the introduction of the composition plug to the holder when the follower is withdrawn to the rear end thereof, the front part of the holder may be made separate from the ratchet part and connected thereto by hinges $n\ n$, so that the front end may be turned away from the wheel B into a position where the plug may be inserted in it, as shown in Fig. 1. To permit such turning of the jointed holder, the front bearing on the carrier is provided with a cap, $D^2$, hinged at one side at $h$, and provided with a spring-catch, $i$, at the opposite side, like the parted nut shown in Fig. 13. By this construction the cap can be raised, the bearing opened, and the holder tipped up, as seen in the dotted lines $E'$ in Fig. 1, and the plug inserted therein at any time that the follower is drawn back. When the new plug is inserted, the holder is replaced in the bearing, the cap closed, and the follower screwed forward into contact with the plug by turning the holder around in the proper direction by hand.

It is obvious that by loosening the clamping-screw $C^2$ the holder might be pushed back far enough to insert a new plug; but in Fig. 15 another means is shown for inserting the plug without removing the follower, when it is not convenient to move the holder away from the polishing-tool, and it consists in forming in the side of the holder an aperture, $m$, large enough to insert the plug, and applying a door or cover, $m'$, to such aperture to hold the plug in place. A spring-catch, $o$, is provided to hold the door shut, and the aperture is extended the entire distance between the holder-journals at $t\ t$, so that the plug requires to be fed forward by hand but a short distance after its insertion in the holder, before it projects from the mouth of the holder.

The constructions last described effect both the rotation of the plug and its forward feeding automatically by mechanism actuated by the reciprocating carrier—as, for instance, the cords $s\ s'$ and the pawl and screw J; but many other and more simple constructions may be devised to carry the invention into effect, as is partly shown by the device drawn in Figs. 11 to 14.

The form of the bed C, the carrier D, and holder E may require to be materially modified in applying the invention to revolving wheels mounted upon different kinds of cast-iron stands and frames. Such are very commonly used; but the invention has been shown herein as mounted upon an ordinary work-bench, as the drawings are thus rendered simpler, and because the forms of the said parts are quite immaterial, as appears from the differences shown in the various figures.

The plugs and holders are shown six-sided in Figs. 1 to 15, and adapted to fit one another; but such form is not essential to the working of my invention, as there is no resistance to the rotation of the plug, and the latter may therefore be made round, if preferred, and held in place by a spring or other clamp inside the holder. Such construction is shown in Figs. 17 and 18, the latter figure showing a cylindrical holder in section, with a leaf-spring, $s^4$, attached at the mouth and bent inwardly at one side of the holder along its entire length, by which construction the plug readily crowds the spring close to the side of the holder when the plug is pushed into the open end.

Provision may also be made for inserting different-sized plugs in the same holder, as by bushing the holder with a lining of suitable shape and size, as at $B^4$ in Fig. 16, where an externally-round bush is shown clamped in the round holder by a screw, $B^5$, and formed with a square hole inside to receive a square plug.

I am aware that a ring of abrading composition has been used as an actual cutting-tool for reducing the size of a rotating metal roll, and that such a ring has been held in a rotating holder; but in such invention the composition was not applied to a buff-wheel, nor was it fed forward within the holder, as in my invention.

I have especially disclaimed herein the invention set forth in the United States Patent No. 261,860, in which a treadle is used to press the polishing composition toward the buff-wheel. In my invention a positive movement is applied to the treadle, and the positive feed produced thereby is substituted for the irregular and uncertain action of the mechanism shown and claimed in the said Patent No. 261,860.

Having thus distinguished my invention from others of analogous character, what I claim herein is—

1. The device herein shown and described for feeding a polishing composition to a buff-wheel, consisting in the combination of the holder adapted to contain a plug of composition, the positive-feeding mechanism capable of only a limited and regulated movement at each actuation of the treadle, and the positively-moved treadle, and the means, substantially as described, and connected therewith, for actuating said mechanism and pushing the composition forward a regulated or uniform distance at each movement of the treadle, substantially as herein set forth.

2. The combination, in a polishing-tool feeder, of a holder mounted to rotate, and the means, substantially as described, for rotating the same, and the means, substantially as described, for feeding the polishing composition forward within the holder.

3. The combination, with the holder, mounted to rotate, and the treadle, and mechanism, substantially as described, for rotating the holder, of the feeding device automatically actuated by the rotation of the holder.

4. The combination, with the holder and means, substantially as described, for turning the same, of a follower fitted to rotate with the holder and the screw attached to the follower and fitted to a stationary nut, so as to feed forward when rotated.

5. The combination, with a polishing-tool, of a holder, a follower fitted thereto and provided with a screw for feeding it forward, and a nut constructed to open, so as to retract the screw and follower, substantially as herein described.

6. The combination, with a polishing-tool, of a holder mounted to rotate in a carrier, means, substantially as described, for adjusting the holder to and from the polishing-tool, and the means, attached to the carrier and operating substantially as described, for rotating the holder therein.

7. The combination, with a polishing-tool, of a holder mounted to rotate in a carrier, means, substantially as described, for adjusting the carrier to and from the polishing-tool, and means, substantially as described, for rotating such adjustable holder and for feeding the composition forward therein.

8. The combination, substantially as described, with a polishing-tool, of a holder mounted upon a carrier and provided with a ratchet-wheel, a pawl and lever mounted upon the carrier and connected with a treadle, for rotating the holder, and means, as spring $e$, for retracting the pawl and treadle, as and for the purpose set forth.

9. The combination, with a polishing-tool, of a rotating holder divided in two parts, for the convenient insertion of the composition, and means, as the bearing with cap $D^2$, for holding the two parts in their operative position, substantially as and for the purpose set forth.

10. The jointed holder provided with hinges $n$ and ratchet-wheel F, in combination with the carrier D, having bearings D' D', one of which is provided with hinged cap $D^2$, the whole arranged and operated substantially as and for the purpose set forth.

In testimony whereof I have hereunto set my hand in the presence of two subscribing witnesses.

HARRY W. SMITH.

Witnesses:
L. LEE,
THOS. S. CRANE.